United States Patent [19]

Staniec

[11] Patent Number: 5,632,886
[45] Date of Patent: May 27, 1997

[54] CUTTING OIL TREATMENT APPARATUS

[75] Inventor: Robert Staniec, San Pedro, Calif.

[73] Assignee: Harvey Universal, Inc., Torrance, Calif.

[21] Appl. No.: 450,479

[22] Filed: May 26, 1995

Related U.S. Application Data

[63] Continuation-in-part of Ser. No. 91,897, Jul. 15, 1993, abandoned, and Ser. No. 205,944, Mar. 1, 1994, Pat. No. 5,462,656, which is a division of Ser. No. 42,120, Apr. 2, 1993, Pat. No. 5,314,620, said Ser. No. 91,897, is a continuation-in-part of Ser. No. 42,120.

[51] Int. Cl.$^6$ .................................................. C02F 3/10
[52] U.S. Cl. ............................................ 210/151; 409/136
[58] Field of Search ..................................... 210/615–618, 210/610, 611, 631, 764, 150, 151, 209, 194, 220, 251; 409/136

[56] References Cited

U.S. PATENT DOCUMENTS

| | | | |
|---|---|---|---|
| Re. 29,996 | 5/1979 | Jordan et al. | 210/281 |
| 895,229 | 8/1908 | Beddoes. | |
| 3,051,315 | 8/1962 | Boester | 210/195.1 |
| 3,884,810 | 5/1975 | Smyrnow | 210/170 |
| 4,002,561 | 1/1977 | Traverse | 210/14 |
| 4,035,289 | 7/1977 | Guillerme et al. | 210/611 |
| 4,251,361 | 2/1981 | Grimsley | 210/703 |
| 4,253,951 | 3/1981 | McCune | 210/631 |
| 4,325,663 | 4/1982 | Lee | 409/136 |
| 4,370,234 | 1/1983 | Marsland | 210/617 |
| 4,584,102 | 4/1986 | Bogart et al. | 210/610 |
| 4,606,867 | 8/1986 | Eguchi | 261/122 |
| 4,620,929 | 11/1986 | Hofmann | 210/610 |
| 4,657,675 | 4/1987 | Zan | 210/170 |
| 4,707,308 | 11/1987 | Ryall | 261/77 |
| 4,857,185 | 8/1989 | Desjardins | 210/150 |
| 4,902,432 | 2/1990 | Kuno | 210/764 |
| 4,915,842 | 4/1990 | Kearney et al. | 210/617 |
| 4,923,619 | 5/1990 | Legios | 210/764 |
| 5,190,646 | 3/1993 | Hattori et al. | 210/151 |

*Primary Examiner*—Thomas G. Wyse
*Attorney, Agent, or Firm*—Karen S. Perkins

[57] ABSTRACT

Apparatus for the biological purification of cutting oil, such as used in metal machining apparatus, is disclosed. The invention herein provides a suitable aerobic environment for remediating cultured aerobic bacteria. These beneficial bacteria act to break down the hazardous organic waste products of anaerobic bacteria and eliminate rank odors in the cutting oil. The cutting oil is aerated to encourage the proliferation of the aerobic bacteria, and to discourage the proliferation of the unwanted anaerobic bacteria.

13 Claims, 5 Drawing Sheets

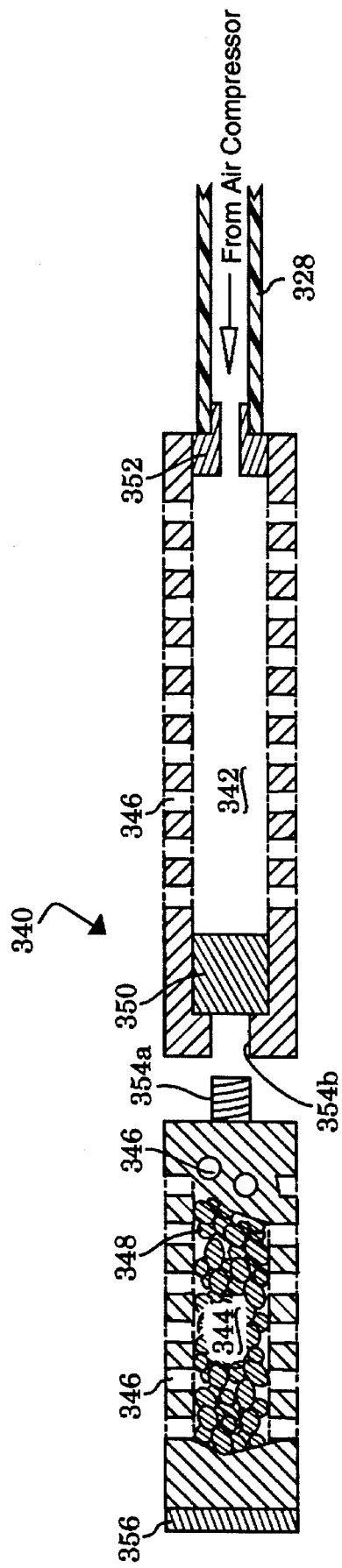
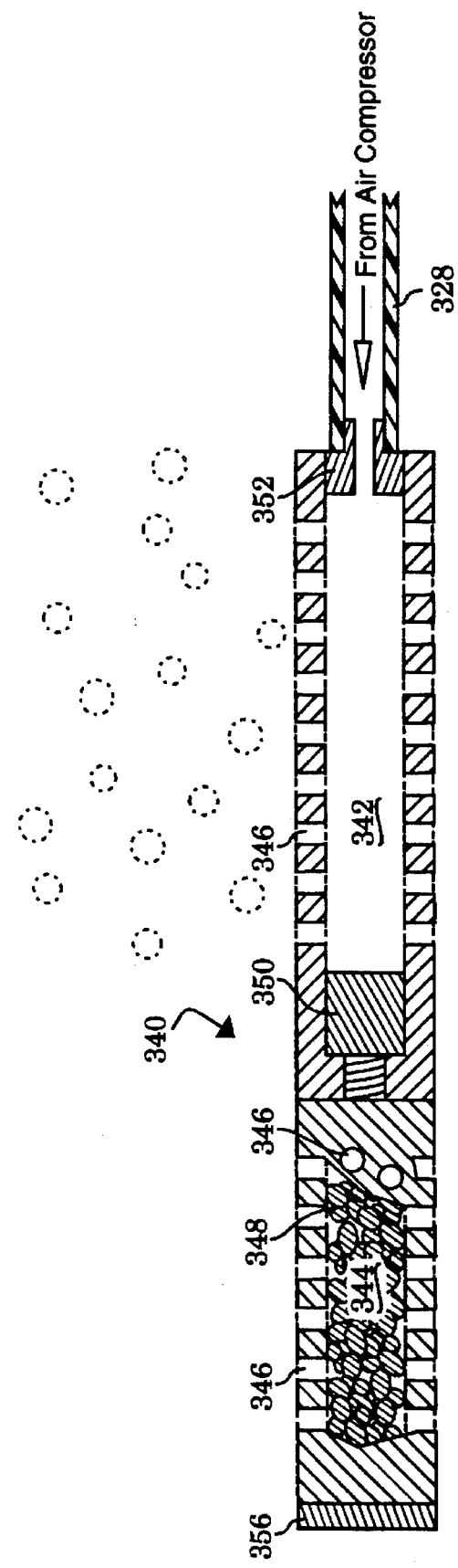
Figure 4a
Figure 4b

CUTTING OIL TREATMENT APPARATUS

CROSS-REFERENCE TO RELATED APPLICATIONS

This is a continuation in part of the earlier U.S. patent application Ser. No. 08/091,897, filed Jul. 15, 1993, now abandoned, which is itself a continuation in part of application Ser. No. 08/042,120, filed Apr. 2, 1993, now issued U.S. Pat. No. 5,314,620; and is a continuation in part of U.S. patent application Ser. No. 08/205,944, filed Mar. 1, 1994, now U.S. Pat. No. 5,462,656, which is a divisional of the same issued U.S. Pat. No. 5,314,620. The disclosure of each of these parent applications is incorporated herein by reference in its entirety.

TECHNICAL FIELD

This invention relates to methods and materials for the remediation of cutting oil used in the machining of metal parts.

BACKGROUND OF THE INVENTION

Cutting oil is a generic term for that class of oils which are used in metal machining operations. Cutting oil generally comprises one or more mineral oil, chlorinated or sulfurized mineral oil, fatty oil, or mixtures thereof. The cutting oil is provided at the cutting surface where a metal-shaping bit is used to modify a metal workpiece. Cutting oil provides a lubricating film between the cutting bit and the workpiece, thus keeping the cutting area cooled. The continuous flow of cutting oil acts to retain metal shards or flakes formed during the cutting process, and to carry these flakes away from the cutting surface. The cutting oil can also contain anti-corrosion agents, emulsifiers, anti-bacterial agents, and the like.

One example of a machining apparatus 110 is shown in FIG. 1. A workpiece 112 (shown in cross section) is supported below a cutting bit 114. The workpiece 112 and the cutting bit 114 are moved relative to one another, either by motion controls such as the handle means 116 shown, or by computer controls (not shown). Generally, motion controls provide relative movement along each of the x, y and z axis.

A reservoir of cutting oil is maintained within the body of the machining apparatus 110. The cutting oil is pumped to a nozzle 118 located proximal to the cutting surface. The cutting oil is sprayed over the workpiece 112 and the cutting bit 114. A drain system (not shown) returns the cutting oil to the reservoir.

The presence of metal flakes in the cutting oil has traditionally limited the effective use life of cutting oils. However, a variety of methods have been developed to enhance the life of the cutting oil by filtering the oil, either before it is sent to the cutting oil reservoir, while it is held within the reservoir, or as it is brought to the cutting surface. Generally, the larger flakes are removed by filtration or straining. The smaller metal flakes can be removed by skimming or other processes. Cutting oil can be filtered by the processes described in U.S. Pat. No. 4,325,663, for example.

Cutting oil can become contaminated by anaerobic bacteria. The presence of anaerobic bacteria in the cutting oil reservoir causes rank and rancid odors, limiting the useful life of the cutting oil for aesthetic reasons. The presence of the anaerobic bacteria can also provide a source of irritation or contagion for the humans who must come into contact with the cutting oil in either liquid or volatilized form.

FIG. 2 shows a cross-sectional representation of a machining apparatus 210 of the prior art. A workpiece (not shown) is supported below a cutting bit 214. Cutting oil provides a lubricating film between the cutting device and the workpiece, thus keeping the cutting area cooled. The cutting oil is removed from the cutting area by a retrieval conduit 220. This retrieval conduit 220 is adapted to deliver used cutting oil from the cutting area to a cutting oil reservoir 222. Within the cutting oil reservoir 222 is a recirculating pump 224 which returns cutting oil to the nozzle 218, continuing the cycle. One or more cutting oil reservoir 222 is generally located within the body of the machining apparatus 210.

SUMMARY OF THE INVENTION

An apparatus for the biological purification of cutting oil, such as used in metal machining apparatus, is disclosed. The invention herein provides beneficial, aerobic bacteria, in a suitable environment, which act to break down the hazardous organic waste products of anaerobic bacteria. The cutting oil is aerated to encourage the proliferation of the seeded aerobic bacteria, and to discourage the proliferation of unwanted anaerobic bacteria.

The combination of aerator mechanism and bacterial starter culture has been found to be very effective. However, because an unfixed bacterial starter culture is mobile, it can migrate to areas of the tank in which there is less aeration, and less current flow, to support the aerobic bacterial proliferation. This is especially problematic in larger tanks.

Therefore, the aerobic bacteria are preferably introduced in a medium which includes an inorganic base material upon which the cultured aerobic bacteria are supported. When a starter culture is fixed on a solid matrix substrate, the substrate is preferably weighted to remain at or near the bottom of the reservoir while permitting easy circulation of the aerated cutting oil. The starter culture media can be attached to a string or other handling means for ease of retrieval from the reservoir and to facilitate culture replacement. More preferably, the solid matrix culture medium is connected directly to the aerator means, and thus is held in position at or near the aeration source.

Accordingly, one preferred apparatus of this invention provides a two-chambered aeration system which is submersible into cutting oil. The first chamber is the aeration chamber. The aeration chamber is connected to an air compressor installed above the surface of the cutting oil. Air is fed from the compressor to the aeration tube, and exits the tube by way of a multiplicity of perforations. Air bubbles are continuously formed to maintain the cutting oil in an aerated state.

The second chamber within the aeration tube is a microbe chamber. This chamber contains a substrate which is appropriate to support aerobic bacteria upon its surfaces. A multiplicity of perforations permit relatively free liquid flow through the microbe chamber and across the aerobic bacteria. Biological remediation of the cutting oil takes place as the aerobic bacteria break down the byproducts of anaerobic bacteria which foul the system. Continued aeration acts to provide a suitable environment for the proliferation of the aerobic bacteria, and ensures that proper mixing of the cutting oil takes place, permitting all of the cutting oil to be remediated.

The aerobic bacteria are innocuous to humans. Generally, the aerobic bacteria includes at least one of a *nitrobacter sp.* or a *pseudomonas sp.* Aeration is preferably done before the introduction of the bacteria culture, and continued subsequent to the introduction of the culture, to promote the growth of the beneficial bacteria.

In accordance with the invention herein, an improved apparatus for machining metal is presented. The improved metal machining apparatus includes, within a cutting oil reservoir, an aeration source and a cultured aerobic bacteria source.

BRIEF DESCRIPTION OF THE DRAWINGS

FIGS. 4a and 4b show partial cross-section views of an improved aeration/remediation apparatus of this invention. FIG. 4a shows the two chamber subunits separated, while FIG. 4b shows the assembled unit in use.

The Figures are drawn for clarity and are not drawn to scale. Similar numbers refer to similar structures throughout the Figures.

DISCLOSURE OF THE INVENTION INCLUDING BEST MODE

Figure 1:
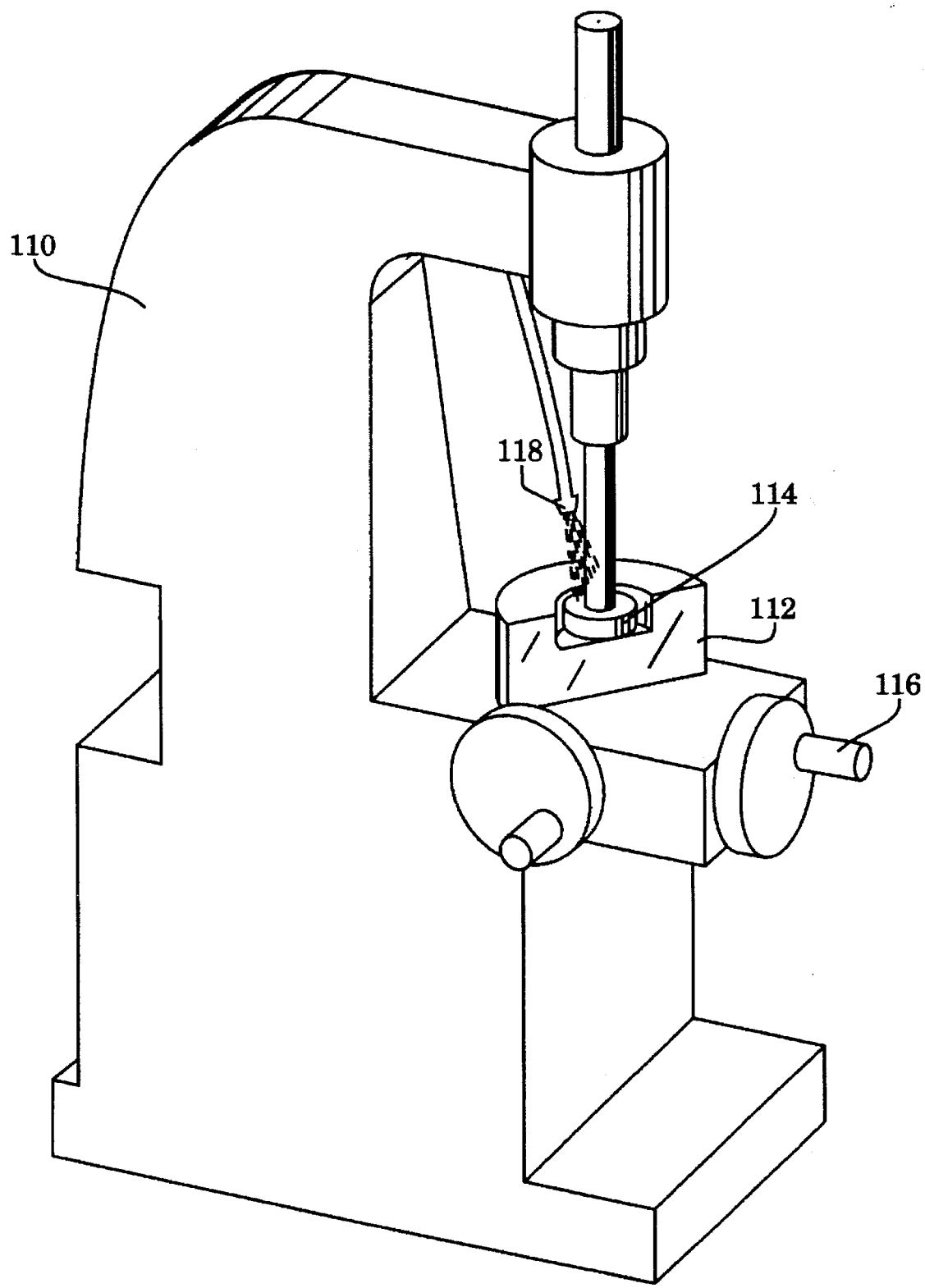
FIG. 1 shows a machining apparatus of the prior art, with a workpiece shown in cutaway view.
Figure 2:
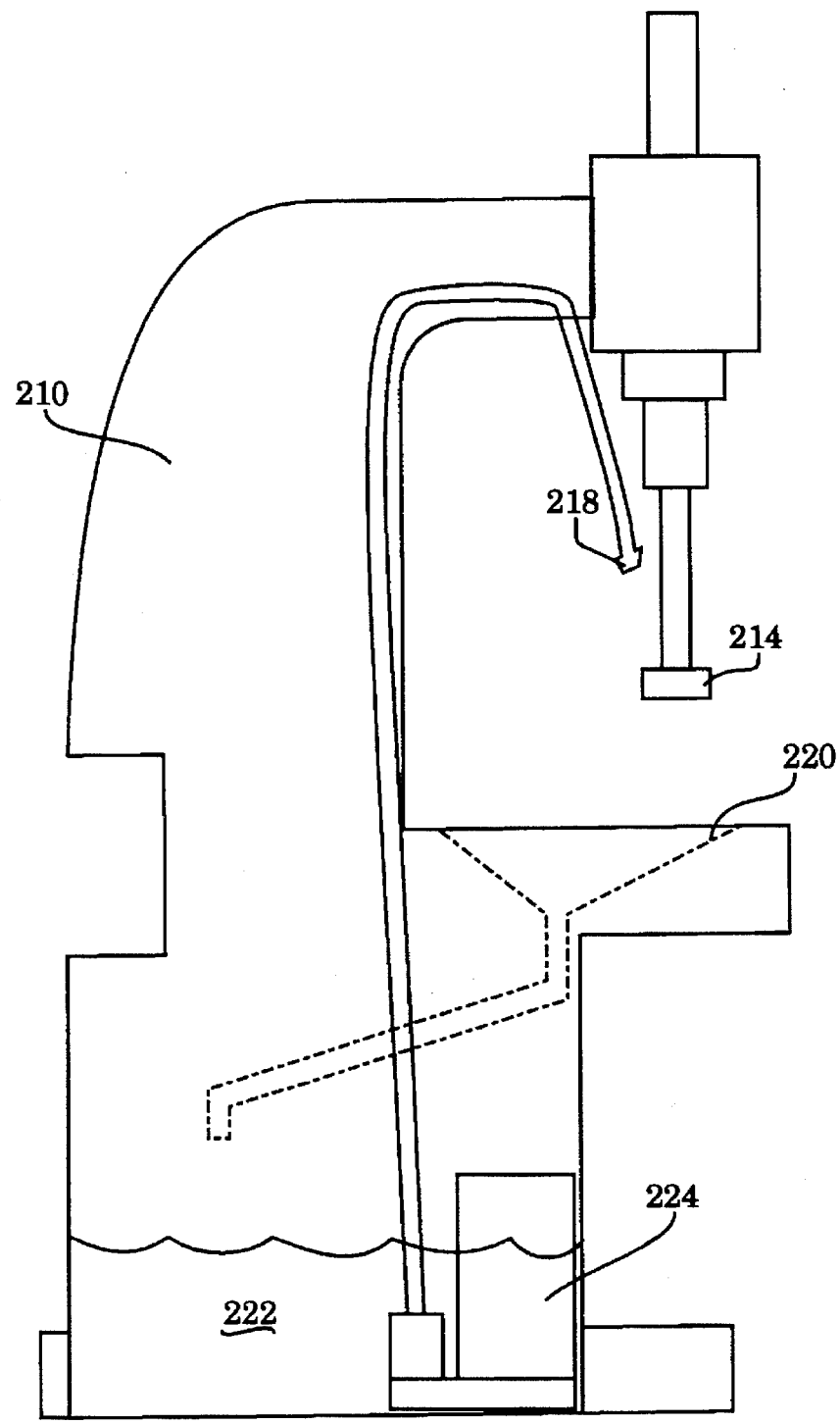
FIG. 2 shows a cross-sectional view of a machining apparatus of the prior art.
Figure 3:
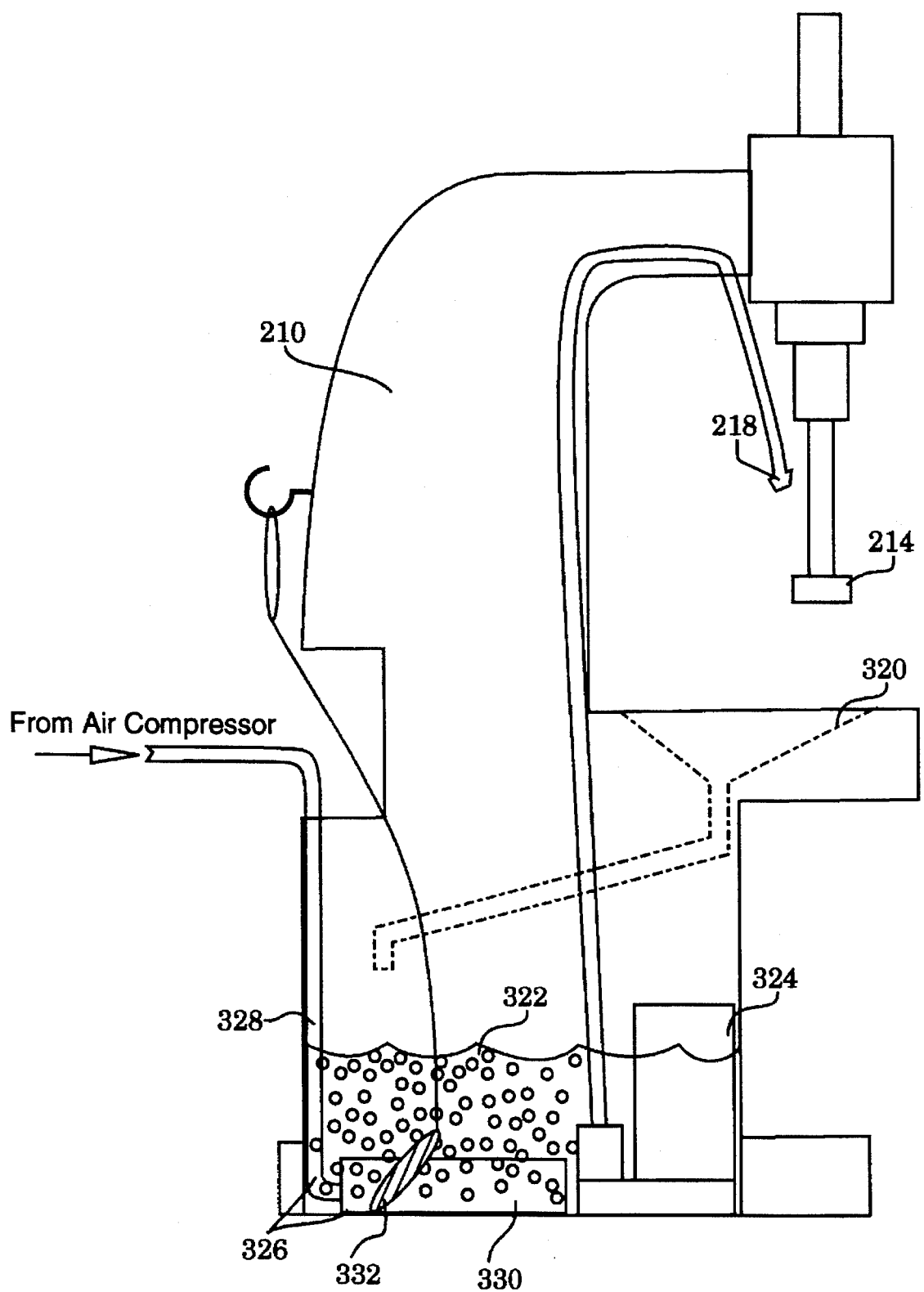
FIG. 3 shows a partial cross-section view of a metal machining apparatus of this invention, including a cutting oil recirculating system, an aeration system, and a source for cultured aerobic bacteria.

FIG. 3 shows a cross-sectional representation of a machining apparatus of this invention which has been retrofitted to supply an aeration/remediation apparatus.

A workpiece (not shown) is supported below a cutting bit 314. Cutting oil is provided at the surface where a metal-shaping bit 314 or blade is used to modify a metal workpiece (not shown). Cutting oil provides a lubricating film between the cutting device and the workpiece, thus keeping the cutting area cooled. Devices which use cutting oil include lathes, cold-saws, milling machines, and the like. Cutting oil provides a lubricating film between the cutting device and the workpiece, thus keeping the cutting area cooled. The continuous flow of cutting oil acts to retain metal shards or flakes formed during the cutting process, and to carry these flakes away from the cutting surface.

During operation of the machining apparatus, the workpiece and the cutting bit 314 are moved relative to one another, as described above. A variety of cutting bits 314 are known to the art, and the specific cutting bit used will vary with the metal being machined and the desired shape of the final product.

The cutting oil is removed from the cutting area by a retrieval conduit 320. This retrieval conduit 320 is adapted to deliver used cutting oil from the cutting area to a cutting oil reservoir 322. Within the cutting oil reservoir 322 is a cutting oil recirculating pump 324 which returns cutting oil to the nozzle 318, continuing the cycle. One or more cutting oil reservoir 322 is generally located within the body of the machining apparatus 310.

In the pictured embodiment, an aeration system 326 is located at least partially within the cutting oil reservoir 322. The aeration system 326 acts to increase the oxygenation of cutting oil in the cutting oil reservoir. If a standard machining apparatus is to be retro-fitted to include an aeration system, an aeration system including an air compressor (not shown) and air tubing 328 is generally used. Air compressors are generally designed to function in a clean, dry environment. Therefore, it is generally convenient to locate the air compressor outside the body of the machining apparatus 310. A variety of appropriate air compressors are known and are commercially available. Care must generally be taken during installation and use of the air compressor to ensure that cutting oil cannot escape the reservoir through or along the air tubing. If possible, the air compressor is placed above the level of the cutting oil in the reservoir to avoid siphoning in the event of power failure. Preferably, an anti-siphon valve (not shown) is positioned along the air tubing 328.

The air tubing 328 is generally connected to one or more air diffusers or airstones 330 which are placed in the cutting oil. It is generally preferred that the air diffuser or airstone 330 device be weighted or otherwise secured to remain at or near the bottom of the reservoir.

Cutting oil is a generic term for that class of oils which are used in metal machining operations. Cutting oil generally comprises one or more mineral oil, chlorinated or sulfurized mineral oil, fatty oil, or mixtures thereof. The cutting oil can also contain anti-corrosion agents, emulsifiers, and the like. It is preferred that the cutting oil used in the subject invention not contain any anti-bacterial agents which would interfere with the proliferation of aerobic bacteria.

In accordance with the invention herein, an aeration system 326 is located at least partially within the cutting oil reservoir 322. The aeration system 326 acts to increase the oxygenation of cutting oil in the cutting oil reservoir. The aeration system 326 is run constantly, whether or not the machining apparatus is being run. Failure of the aeration system 326 can cause die-off of the aerobic bacteria within the system. If the aeration system 326 has been disconnected for 12 hours or more, it is generally recommended that the reservoir 322 system be re-seeded with a new aerobic bacteria starter culture 332.

Air tubing 328 is connected at one end to the air compressor, and at the other end to an air diffuser or airstone. Air tubing 328 is commercially available in varying rigidity, diameters and lengths. Generally, the rigidity, diameter and length of the air tube will be dictated by the specific air compressor used and its proximity to the fluid reservoir.

If flexible air tubing 328 is threaded through curves having a small radius, a rigid pinch protection collar should be provided to avoid crimping of the tubing. In one embodiment, hooks or other such devices are provided to secure the air tubing 328 along its course from the air compressor to the airstone or air diffuser. By securing the air tubing 328 in place, inadvertent crimping of the tubing can be minimized or avoided.

The air tubing 328 is generally connected to one or more air diffusers or airstones 330. When more than one air diffuser or airstone is used, a "T" connector or splitter can be used to provide multiple tubing connections between a single air compressor and multiple airstone units. It is generally preferred that the air diffuser or airstone 330 device be weighted or otherwise secured to remain at or near the bottom of the reservoir.

A wide variety of stone, ceramic, and polymeric airstones 330 are commercially available. Over time, airstones may become clogged. The airstone should be kept clean according to the manufacturer's instructions, and replaced regularly.

As air bubbles continuously rise from the perforations of the air diffuser or airstone toward the surface of the cutting oil, a negative pressure is created, drawing up cutting oil which is present just below and surrounding the aeration source. The bubbles cause the movement of the mass of liquid in a predictable manner. Specifically, the cutting oil forms currents which flow upwards from the aerator, then away once the bubbles break at the surface. The current flows downward again, and then is brought inward toward the aerator to repeat the cycle. The volume of air moved, the size of the bubbles formed, and the volume of the liquid each contribute in part to the strength and parameters of the current.

Aerobic and anaerobic bacteria are normally present as contaminants in cutting oil. The initiation of aeration will generally start the process of encouraging the proliferation of aerobic bacteria and discouraging the proliferation of anaerobic bacteria. The process of colonization the preferred bacteria can be dramatically shortened by seeding the cutting oil with a starter culture 332 of the desired aerobic bacteria. For best results, this starter culture is introduced into the cutting oil concurrent with, or slightly after, the start of the aeration process.

The temperature of the cutting oil reservoir will generally be about room temperature. Even while cutting oil is being used (and therefore heated) at the cutting surface, the aeration (generally, air at approximately room temperature) will act to stabilize the temperature within the reservoir. Generally, however, the temperature should be kept with the range of about 15° C. to about 37° C. The pH of the cutting oil will generally remain in the range of about 6 to about 8.5.

If the temperature, pH, or other variable causes the bacteria die off, and rank odors result, it is recommended that the cutting oil be discarded and fresh cutting oil, with an appropriate bacterial starter culture, be placed into the system.

Generally, the aerobic bacteria which are encouraged for proliferation in the cutting oil aeration system are those bacteria which facilitate an aerobic decomposition of the decomposable organic materials suspended in the cutting oil. Nitrifying bacteria, such as *nitrobacter sp.* and *pseudomonas sp.*, are especially appropriate.

The bacteria starter culture 332 must be compatible with the cutting oil, and must not interfere with the function of the cutting oil. The bacteria starter culture 332 is therefore preferably provided on an inorganic matrix which is insoluble in cutting oil. The inorganic matrix includes cultured aerobic bacteria on surfaces upon and within the matrix. One suitable matrix material is perlite. When a particulate matrix is used, it is generally preferable to contain the particulate material within a flow-through structure. For example, a rigid or flexible plastic outer structure having a plurality of holes therethrough can enclose a non-woven nylon filter membrane. These materials can be hot-stamped to fuse them into a suitable container for a particulate perlite matrix.

Aerobic bacteria can be cultured from native bacteria in soil, or can be cultured from an aerobic cutting oil environment. Alternatively, a commercially prepared bacterial starter can be used. A variety of suitable aerobic bacteria cultures are commercially available. The "Bio 520" starter culture, available from Harvey Universal, Inc. (Torrance, Calif.) is especially suitable. "Hi-Clean Σ" from Sankai Chemical Co. (Tokyo, Japan) can also be used.

Preferably when a solid matrix starter culture 332 is used, it is weighted to remain at or near the bottom of the reservoir 322 while permitting easy circulation of the aerated cutting oil. When a solid matrix unconnected to the aeration system 326 is used to provide the starter culture, it can be attached to a string or other handling means for ease of retrieval from the reservoir 322. In the pictured embodiment, a string 334 is connected to a hook 336 to provide easy access to the starter culture 332.

FIG. 3 shows an embodiment in which a single airstone 330 provides aeration for the reservoir 322. Rigid air tubing 328 connects the single airstone 330 to the air compressor (not shown). As pictured, the retrieval conduit 320 preferably provides returning cutting oil at a point distant from the recirculating pump 324. This helps maintain a good circulatory flow, in which cutting oil is brought across the airstone 330 and the starter culture 332.

In a preferred embodiment, the aeration system and the microbial culture are introduced into the cutting oil within a joined structure having two separate sections or chambers. Particularly preferred embodiments are shown in FIGS. 4a and 4b, FIG. 5, and FIG. 6.

FIGS. 4a and 4b show the two chambers of a preferred joined aeration/microbial support structure 340 of this invention. The first chamber is the aeration chamber 342. The aeration chamber 342 acts as an airstone or air diffuser, to break up a stream of air or oxygen supplied by the compressor (not shown) into discrete bubbles, which escape from the aeration chamber 342 through a multiplicity of perforations 346. The rising bubbles produce currents of aerated cutting oil within the cutting oil liquid being remediated.

The second chamber of the joined aeration/microbial support structure 340 is the microbe chamber 344. The microbe chamber includes a multiplicity of perforations 346, to permit the currents created by the aeration of the liquid to pass across the surface of a matrix 348 within the microbe chamber 344. The surface of the matrix 348 is seeded with aerobic bacteria which, under appropriate conditions, cause the biological remediation of the cutting oil in which the apparatus is placed.

Air tubing 328 is connected at one end to the air compressor, and at the other end to the aeration chamber 342. Air tubing 328 is commercially available in varying rigidity, diameters and lengths. Generally, the rigidity, diameter and length of the air tube will be dictated by the specific air compressor used and its proximity to the fluid reservoir.

The aeration chamber 342 is preferably a perforated tube which acts as an air diffuser. For example, a porous polyethylene tube having a 3-inch outer diameter and a 3/16-inch wall polyethylene tube can be used. The length of the tubing will vary with the application, but will commonly be from less than 2 inches to more than 12 inches in length. Generally, the pore size is from about 40 micron to about 80 micron, more preferably about 60 micron. Appropriate tubing is commercially available from Porex Technologies, Fairburn, Ga., as Porex porous plastic tubing.

In the pictured embodiment, a cap 352 provides a male pipe thread or hose barb to connect standard air tubing 328 to the aeration chamber 342. When the joined aeration/microbial support structure 340 is three inches in diameter, the air tubing 328 will be, for example, 3/4 inch in diameter. Such air tubing is readily available commercially.

In alternate embodiments (not shown), the aeration chamber is a stone, ceramic, or polymeric airstone. Such airstones are commercially available in a variety of sizes and shapes, and can function as the aeration chamber 342.

The aeration chamber 342 is physically joined to the microbe chamber 344. Conveniently, the microbe chamber 344 can be removed for periodic replacement, and thus is readily separable from the aeration chamber 342. In one preferred embodiment, the microbe chamber 344 is joined with the aeration chamber 342 in an end-to-end configuration. In the pictured embodiment, a screw cap 354a on the microbe chamber 344 is fitted into a threaded receptacle 354b on the aeration chamber 342. Other temporary or permanent joining schemes and configurations will be readily apparent to those skilled in the art.

The microbe chamber 344 is preferably a perforated tube. For example, a porous polyethylene tube having a 3-inch outer diameter and a 3/16-inch wall polyethylene tube can be used. The length of the tubing will vary with the application, but will commonly be from less than 2 inches to more than 4 inches in length. Generally, the pore size is from about 250 micron to about 350 micron, more preferably about 250 micron. Appropriate tubing is commercially available from Porex Technologies, Fairburn, Ga., as Porex porous plastic tubing. Like the aeration chamber 342, the microbe chamber 344 is conveniently capped 354a, 356 at each end.

As shown in FIGS. 4a and 4b, the microbe chamber 344 is a perforated chamber which allows the currents generated by the aeration chamber 342 to flow in and out. The perforated housing can be made of any suitable material, such as polymers, ceramics, plastics, and the like.

Within the microbe chamber 344 is a matrix 348 which is suitable for the growth and proliferation of aerobic bacteria. An inorganic matrix 348 which is insoluble in the surrounding liquid is preferably used. The inorganic matrix 348 includes cultured aerobic bacteria on surfaces upon and within the matrix. A suitable matrix 348 material is perlite. The matrix 348 is contained within the perforated chamber by use of perforations 346 which are too small for the matrix substrate to fit through. In a less-preferred embodiment (not shown), a rigid or flexible housing structure having a plurality of relatively large holes therethrough can enclose, for example, a non-woven nylon filter membrane, which in turn confines the particulate matrix. These materials can be hot-stamped to fuse them into a suitable container for a particulate matrix 348.

Figure 5:
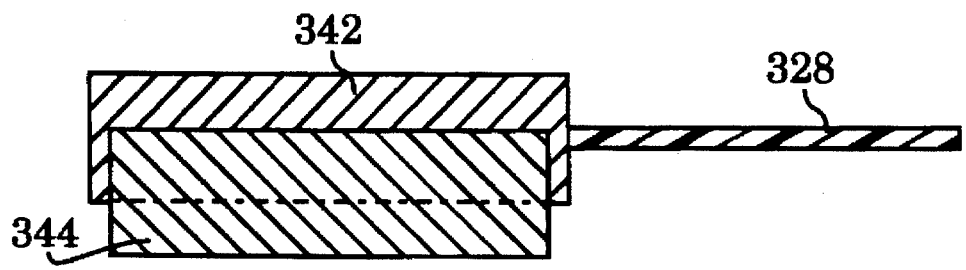
FIGS. 5 and 6 show alternate configurations of the aeration chamber and microbe chamber.

In an alternate embodiment, shown in FIG. 5, the microbe chamber 344 surrounds the lower surfaces of the aeration chamber. The aeration chamber may be attached, for example, by pressure-fitting, or with the use of appropriate fastening means. Cutting oil is carried through the microbe chamber 344 as it passes upward, drawn by the rising bubbles.

Figure 6:
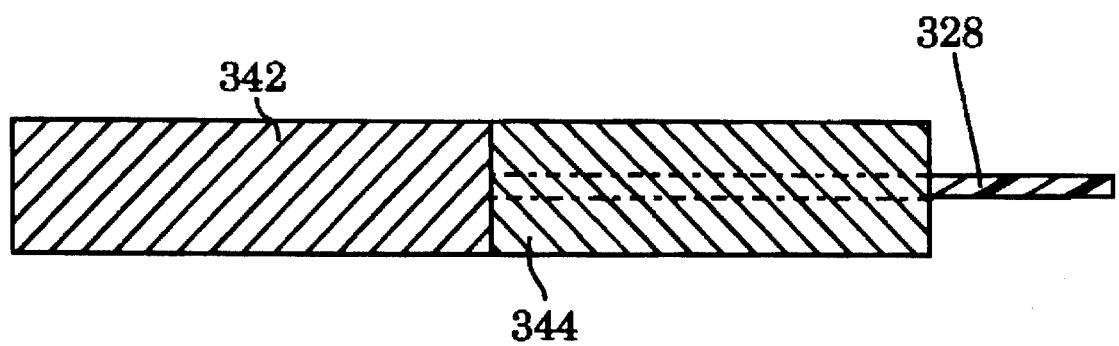

In another embodiment, shown in FIG. 6, the microbe chamber 344 forms a collar about the airline tubing 328. In the pictured embodiment, for example, removal of the microbe chamber may be effected by removal of the aerator 342.

The microbe chamber 344 of either of FIG. 5 or FIG. 6 may be fixed, or may be removable from the aerator structure. A variety of connecting means will be obvious to those skilled in the art, and may depend upon the materials used in the aeration chamber 342 and in the microbe chamber 344. Such variations will be obvious to those skilled in the art.

While the invention has been described in connection with several exemplary embodiments, it will be understood that many modifications will be apparent to those of ordinary skill in the art in light of the above disclosure. Such modifications may include using substitute materials, smaller or greater dimensions, varying the number and placement of starter culture media or chambers, using a variety of different aeration devices, using a variety of connector means, and so forth, to achieve substantially the same results in substantially the same way. Reference to the following claims should be made to determine the scope of the invention.

I claim:

1. An apparatus for the remediation of an anaerobically fouled cutting oil, said apparatus comprising:

(a) a housing comprising two chambers which is removably insertable into said cutting oil, said housing comprising:
      (i) an aeration chamber, said aeration chamber having a plurality of openings for the escape of air bubbles into the surrounding cutting oil; and
      (ii) a bacterial support chamber, said chamber supporting cultured aerobic bacteria on an inorganic particulate substrate therein, and said chamber permitting flow of the surrounding cutting oil into and out of the bacterial support chamber; and (b) an air compressor means for continuously providing air to said aeration chamber.

2. An apparatus of claim 1 wherein said cultured aerobic bacteria includes at least one selected from the group consisting of *nitrobacter sp., pseudomonas sp.*, and mixtures thereof.

3. An apparatus of claim 1 wherein said aeration means further comprises at least one from the group consisting of an air diffuser and an airstone.

4. An apparatus of claim 1 wherein said aeration chamber is removably joined to said bacterial support chamber.

5. An apparatus of claim 1 wherein said aeration chamber includes an upper surface and a lower surface, and wherein bacterial support chamber is attached to said lower surface of said aeration chamber.

6. An apparatus of claim 1 wherein said air compressor provides air to said aeration chamber via airline tubing, and wherein said bacterial support chamber is attached to said airline tubing.

7. An apparatus for the remediation of an anaerobically fouled cutting oil, said apparatus comprising a two-chambered housing which is removably placed within a cutting oil reservoir and which is connectable to an air source, said housing comprising:

(a) an aeration chamber, said aeration chamber having a plurality of openings for the escape of air bubbles into cutting oil; and (b) a bacterial support chamber, said chamber supporting aerobic bacteria on a surface therein, said chamber permitting flow of cutting oil into and out of the bacterial support chamber.

8. An apparatus of claim 7 wherein the aerobic bacteria includes at least one selected from the group consisting of *nitrobacter sp., pseudomonas sp.*, and mixtures thereof.

9. An apparatus of claim 7 wherein said bacterial support chamber includes a particulate inorganic substrate material containing cultured bacteria thereupon.

10. An apparatus of claim 7 wherein said aeration means further comprises at least one from the group consisting of an air diffuser and an airstone.

11. An apparatus of claim 7 wherein said aeration chamber is removably joined to said bacterial support chamber.

12. An apparatus of claim 7 wherein said aeration chamber includes an upper surface and a lower surface, and wherein bacterial support chamber is attached to said lower surface of said aeration chamber.

13. An apparatus of claim 7 wherein said aeration chamber is connectable to an air source via airline tubing, and wherein said bacterial support chamber is attached to said airline tubing.

\* \* \* \* \*